하지 않음

United States Patent
Sugiyama

(10) Patent No.: US 6,205,176 B1
(45) Date of Patent: Mar. 20, 2001

(54) MOTION-COMPENSATED CODER WITH MOTION VECTOR ACCURACY CONTROLLED, A DECODER, A METHOD OF MOTION-COMPENSATED CODING, AND A METHOD OF DECODING

(75) Inventor: Kenji Sugiyama, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/123,490

(22) Filed: Jul. 28, 1998

(30) Foreign Application Priority Data

Jul. 28, 1997 (JP) .................................................. 9-217064

(51) Int. Cl.⁷ ...................................................... H04B 1/66
(52) U.S. Cl. ................................. 375/240.12; 375/240.17
(58) Field of Search ..................................... 348/699, 416, 348/443, 571, 402, 407, 413, 418, 415, 412; 382/236, 238; 375/240, 240.12, 240.16, 240.17; 386/111

(56) References Cited

U.S. PATENT DOCUMENTS

| | | | | |
|---|---|---|---|---|
| 4,864,394 | * | 9/1989 | Gillard .................................. | 348/699 |
| 5,587,741 | * | 12/1996 | Kim ...................................... | 348/416 |
| 5,682,205 | * | 10/1997 | Sezan et al. ........................ | 348/452 |
| 5,731,840 | * | 3/1998 | Kikuchi et al. ..................... | 348/416 |
| 5,786,860 | * | 10/1998 | Kim et al. ........................... | 348/699 |
| 5,818,536 | * | 10/1998 | Morris et al. ....................... | 348/416 |
| 6,025,881 | * | 2/2000 | Kikuchi et al. ..................... | 348/416 |

* cited by examiner

Primary Examiner—Chris S. Kelley
Assistant Examiner—Gims Philippe
(74) Attorney, Agent, or Firm—Israel Gopstein

(57) ABSTRACT

A decoder for decoding video data through motion-compensated prediction coding and a method of motion-compensated-predictive-coding video data are disclosed. N motion vectors at N different accuracies are obtained every first block of pixels of the video data respectively, the N motion vectors are combined at every second block including M of the first blocks every the N different accuracies, M and N being natural numbers more than one, N amounts of code of the N motion vectors are obtained and motion-compensated-predictive-coded video data are obtained using the N the motion vectors at every the accuracy; one of the N different accuracies showing the lowest one of the N amounts is selected; accuracy data indicative of the one of the N different accuracies is generated; the motion vectors corresponding to the selected one of the N different accuracies are outputted; and the video data is motion-compensated-predictive-coded using the outputted motion vectors at the selected one of the N different accuracies, and the motion-compensated-predictive-coded video data, the outputted motion vectors, and the accuracy data are outputted. The corresponding decoder and a corresponding method are also disclosed.

13 Claims, 8 Drawing Sheets

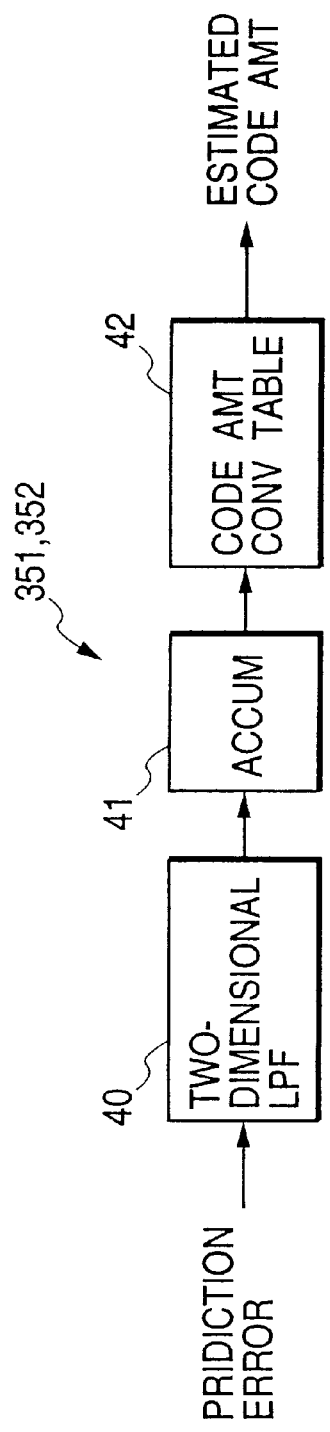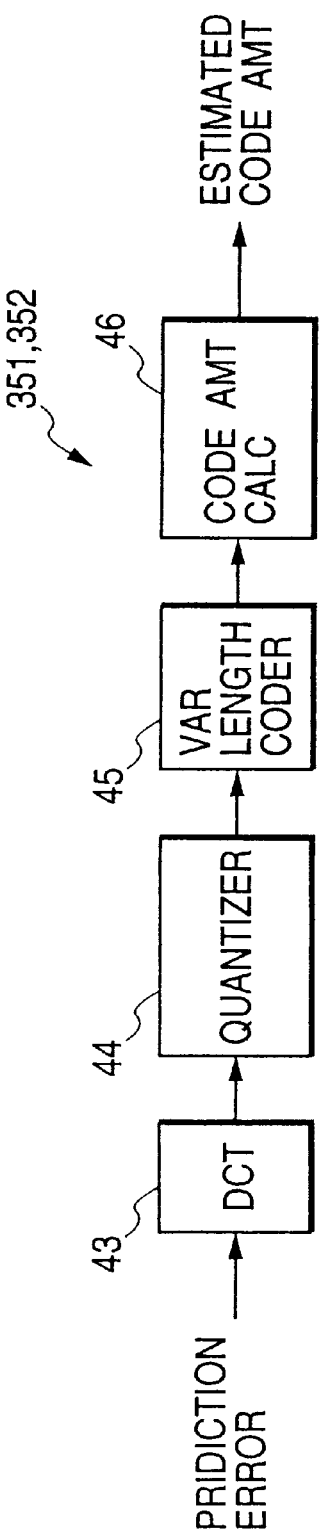

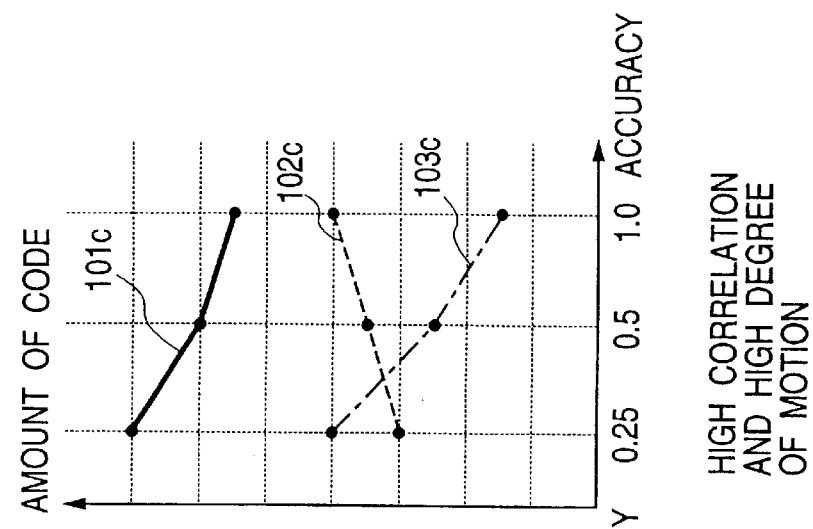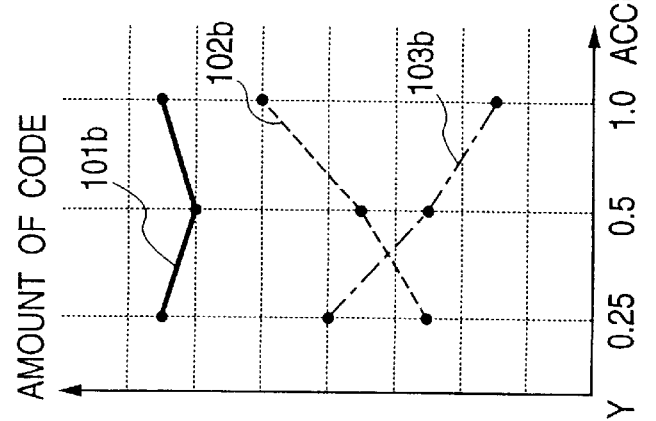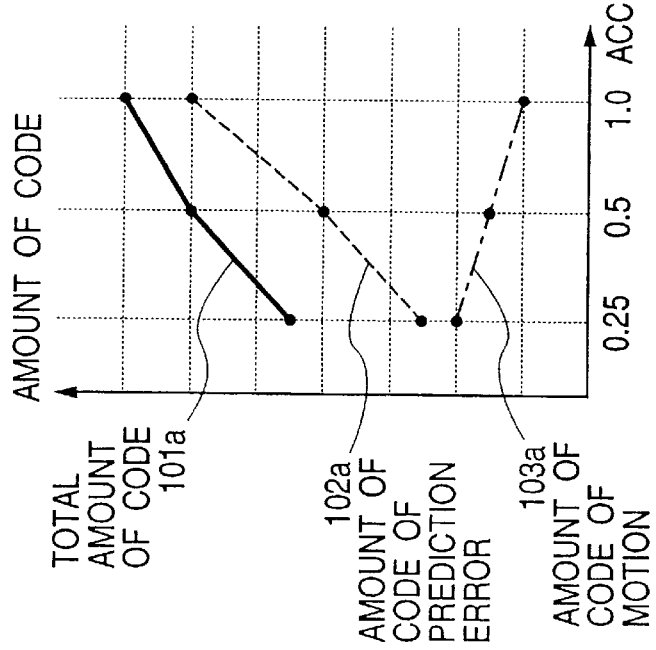

MOTION-COMPENSATED CODER WITH MOTION VECTOR ACCURACY CONTROLLED, A DECODER, A METHOD OF MOTION-COMPENSATED CODING, AND A METHOD OF DECODING

BACKGROUND OF THE INVENTION

1. Field of the Invention

This invention relates to a motion-compensated coder, a decoder, a method of motion-compensated coding, and a method of decoding.

2. Description of the Prior Art

A motion compensated coder for motion-compensated-coding video data is known and a decoder for decoding the motion-compensated-coded video data is also known.

The motion compensation is generally effected every unit of 16×16 pixels to 8×8 pixels. The motion of an image, i.e., the motion vector is obtained at the same unit. An accuracy of the motion vector(MV) is generally one or a half pixel. If the motion compensation is used in coding, the motion vector is coded and sent to the decoder side.

FIG. 7 is a block diagram of a prior art motion-compensated coder.

Input video data is supplied to a subtractor 2 and to a motion estimator 71 through an input terminal 1. The subtractor 2 subtracts a motion-compensated-predicted signal 10a from the input video data and supplies the difference as a prediction error to a DCT (Discrete Cosine Transform) 3.

The DCT 3 effects a discrete cosine transforming process at 8×8 pixels and supplies the obtained coefficients to a quantizer 4. The quantizer 4 quantizes the coefficients with predetermined step amount and outputs a fixed length coded coefficients to the variable length coder 5 and to an inverse quantizer 9.

Generally, the quantizing step amount is controlled in accordance with an amount of codes to keep the data rate constant.

The variable length coder 5 converts coefficients of two dimensional 8×8 pixels into one dimensional array through zigzag scanning and codes the coefficients by Huffman coding. This inter-frame prediction error signal is multiplexed with coded motion vectors by a multiplexer 14.

On the other hand, inverse processes of the DCT 3 and the quantizer 4 are executed by the inverse quantizer 9, an inverse DCT 13 to reproduce the inter-frame prediction error. The reproduced prediction error is added to motion-compensated-predicted signal 10a to provide a reproduced video data which is stored in a video memory 73.

Reproduced video from the video memory 73 is supplied to the motion estimator 71 and to a motion-compensated predictor 72. The processing from the inverse quantizer 9 to the video memory 73 is called as local decoding which is essentially the same processing of the corresponding decoder.

The motion-compensated predictor 72 shifts video data stored in the video memory 73 every block in accordance with the motion vectors from the motion estimator 71 to obtain a motion-compensated-predicted signal 10a which is supplied to the subtractor 2 and to the adder 12.

The motion estimator 71 effects block matching between the reproduced video data stored in the video memory 73 and the input video data with the reproduced video data shifted every motion compensation block and determines the motion vector MV showing best matching (lowest error). The obtained motion vector is supplied to a motion vector coder 74 for coding the motion vector and to the motion-compensated predictor 72.

The motion vector coder 74 obtains a difference between horizontal components of the motion vectors at the one block previous block (generally left) and the present block and a difference between vertical components of the motion vectors at the one block previous block (generally left) and the present block and codes the difference values with Huffman codes to supply the obtained code train (bit stream) of the motion vector to the multiplexer 14 which multiples the code train (bit stream) of the motion vector with the code train (bit stream) of the inter-frame prediction error signal, i.e., the output of the variable length coder 5 to output coded signal 15.

FIG. 8 is a block diagram of a prior art decoder corresponding to the motion-compensated prediction coder shown in FIG. 7.

The coded signal 15 is inputted from an input 21 and supplied to a separator 22 which separates the coded signal into the code train of the inter-frame prediction error and the code train of the motion vectors. The inter-frame prediction error is converted into the fixed length code by a variable length decoder 23 which outputs 8×8 pixels of coefficients which are supplied to an inverse quantizer 9. The inverse quantizer 9 and an inverse DCT 13 outputs reproduced prediction errors. On the other hand, the code train of the motion vectors is supplied to a motion vector decoder 81 which decodes the code train of the motion vectors and supplies the obtained motion vector data to a motion-compensated predictor 82. The motion-compensated predictor 82 generates inter-frame prediction signal with the video data stored in a video memory 83 motion-compensated in accordance with the motion vector data from the motion vector decoder 81. The adder 12 adds the inter-frame prediction error signal to the reproduced prediction errors to output reproduced video data 124 which is stored in the video memory 83. The adder 12, the inverse quantizer 9, and the inverse DCT 13 in FIG. 8 have the same structure as those shown in FIG. 7 respectively.

In these prior art motion-compensated prediction coder and motion-compensated prediction decoder, the accuracy of the motion vector is fixed. Therefore, in the case of the image showing a low self-correlation (there is a lot of amounts of high frequency component), it is possible to make the prediction error low by the high accuracy motion prediction. However, in the case of the image showing high self-correlation (there is a few amount of high frequency component) the high accuracy motion compensation prediction does not contribute to reduction in the prediction error, so that the motion vector data is not efficiently used.

SUMMARY OF THE INVENTION

The aim of the present invention is to provide a superior motion-compensated coder, a superior decoder, a superior method of motion-compensated coding and a superior method of decoding.

According to the present invention, a motion-compensated predictive coding apparatus is provided, which includes: a motion vector estimation circuit responsive to video data and local decoded video data for obtaining N kinds of motion vectors at N different accuracies every first block of pixels of the video data respectively; a vector combining circuit responsive to the motion vector estimation circuit for combining the N kinds of motion vectors at every second block including M of the first blocks every the N different accuracies, M and N being natural numbers, N being more than one; a motion vector accuracy selection circuit responsive to the vector combining circuit, the video data, and the local decoded video data for obtaining N total amounts of code of the N kinds of motion vectors and motion-compensated-predictive-coded video data at the N different accuracies, selecting one of the N different accuracies showing the lowest one of the N total amounts, generating accuracy data indicative of one of the N different accuracies, and outputting the motion vectors corresponding to the selected one of the N different accuracies and the accuracy data; and a motion-compensated predictive coding circuit responsive to the video data and motion vector accuracy selection circuit for motion-compensated-predictive-coding the video data using the outputted motion vectors at the selected one of the N different accuracies, generating the local decoded video data, and outputting the motion-compensated-predictive-coded video data, the outputted motion vectors, and the accuracy data.

In the motion-compensated predictive coding apparatus, the motion vector accuracy selection circuit may include N first amount detection circuits for coding the motion vectors at every second block and thereby, obtaining the N amounts of code of the N kinds of motion vectors at every N different accuracies; N second amount detection circuits responsive to the video data, the local decoded video data, and the vector combining circuit for motion-compensated-predictive-coding the video data using the N kinds of motion vectors every second block to generate N kinds of prediction error codes, and obtaining N amounts of the prediction error codes respectively; N adders for respectively adding the N amounts of code of the N kinds of motion vectors to the N kinds of prediction error codes to obtain the N total amounts; and a selection circuit for selecting one of the N different accuracies corresponding to the lowest one of the N total amounts; and an outputting circuit for generating and outputting the accuracy data indicative of the selected one of N different accuracies and selectively outputting the motion vectors corresponding to the selected one of N different accuracies.

According to the present invention, a decoder supplied with coded data including motion-compensated-predicted video data and data including codes of motion vectors and accuracy data, is provided, the motion vectors being obtained every first block at one of N accuracies every second block including M of the first block at one of the N accuracies indicted by the accuracy data. It includes: a separating circuit for separating the coded data into the motion-compensated-predicted video data and the data; a motion-compensated inter-frame prediction circuit including a multiplying circuit responsive to the separating circuit for generating a motion-compensated inter-frame predicted signal from the codes of motion vectors multiplied with the accuracy data, so that the accuracy is selected every second block; and an inter-frame prediction decoding circuit for decoding the motion-compensated-predicted video data from the separating circuit with the motion-compensated inter-frame prediction signal and outputting decoded video data.

According to the present invention, a method of motion-compensated-predictive-coding video data is provided. The method includes steps of: (a) obtaining N kinds of motion vectors at N different accuracies every first block of pixels of the video data respectively; (b) combining the N kinds of motion vectors at every second block including M of the first blocks every the N different accuracies, M and N being natural numbers, N being more than one; (c) obtaining N total amounts of code of the N kinds of motion vectors and motion-compensated-predictive-coded video data obtained using the N kinds of the motion vectors at every the accuracy; (d) selecting one of the N different accuracies showing the lowest one of the N amounts; (e) generating accuracy data indicative of selected one of the N different accuracies; (f) outputting the motion vectors corresponding to the selected one of the N different accuracies; (g) motion-compensated-predictive-coding the video data using the outputted motion vectors at the selected one of the N different accuracies, generating the local decoded video data, and (h) outputting the motion-compensated-predictive-coded video data, the outputted motion vectors, and the accuracy data.

In this method, the step (d) may comprise steps of: coding the motion vectors at every second block at the N different accuracies; obtaining the N amounts of code of the N kinds of motion vectors at every N different accuracies; motion-compensated-predictive-coding the video data using the N kinds of motion vectors every second block to generate N kinds of prediction error codes; obtaining N amounts of the N kinds of prediction error codes; respectively adding the N amounts of code of the N kinds of motion vectors to the N kinds of prediction error codes to obtain the N total amounts; and selecting one of the N different accuracies corresponding to the lowest one of the N total amounts; generating accuracy data indicative of one of the N different accuracies showing the lowest one of the N total mounts; and outputting the accuracy data and the motion vectors corresponding to the selected one of the N different accuracies.

According to the present invention, a method of decoding coded video data including motion-compensated-predicted video data and data including codes of motion vectors and accuracy data is provided, the motion vectors being obtained every first block at one of N accuracies selected every second block including M of the first block at one of the N accuracies indicted by the accuracy data, M and N being natural numbers, N being more than one. The method comprises the steps of: separating the coded video data into the motion-compensated-predicted video data and the data including codes of motion vectors and accuracy data; generating a motion-compensated inter-frame predicted signal from the codes of motion vectors multiplied with the accuracy data, the accuracy being selected every second block; and decoding the separated motion-compensated-predicted video data with the motion-compensated inter-frame predicted signal; and outputting the decoded video data.

BRIEF DESCRIPTION OF THE DRAWINGS

The object and features of the present invention will become more readily apparent from the following detailed description taken in conjunction with the accompanying drawings in which:

FIGS. 4A and 4B are block diagrams of the code amount estimator shown in FIG. 3;

FIGS. 6A to 6C are graphical drawings of this embodiment showing variation of the amount of code;

The same or corresponding elements or parts are designated with like references throughout the drawings.

DETAILED DESCRIPTION OF THE INVENTION

Prior to describing embodiment, the concept of this invention will be described.

In this invention, a total amount of code is reduced by obtaining N (a natural number more than one) kinds of motion vectors at N different accuracies, combining the N kinds of motion vectors into N groups (motion vector blocks) of the motion vectors every the N different accuracies, obtaining N amounts of codes with the N kinds of motion vectors, selecting and outputting one of the N different accuracies showing a lowest mount of the code.

Then, at the image showing low self-correlation (fine picture image), the accuracy of the motion compensation becomes fine, so that the inter-frame prediction error becomes lowest. At this portion, because the motion is slow, so that the amount of the codes of the motion vectors does not largely increase.

On the other hand, at the flat image showing high self-correlation, the accuracy of the motion compensation becomes coarse, so that the amount of the codes of the motion vectors decreases. At such image, the accuracy of the motion compensation does not affect the inter-frame prediction error too much. In the case of a quickly moving portion, the self-correlation is also high due to motion blur.

In this invention, data of the accuracy of the motion compensation is added to the outputted video data. However, only a negligible amount of data is added such as one or two bits per tens of blocks and the total amount of codes is low because the accuracy of the motion vectors which is estimated to be lowest is selected.

Hereinbelow will be described an embodiment of this invention.

Figure 1:
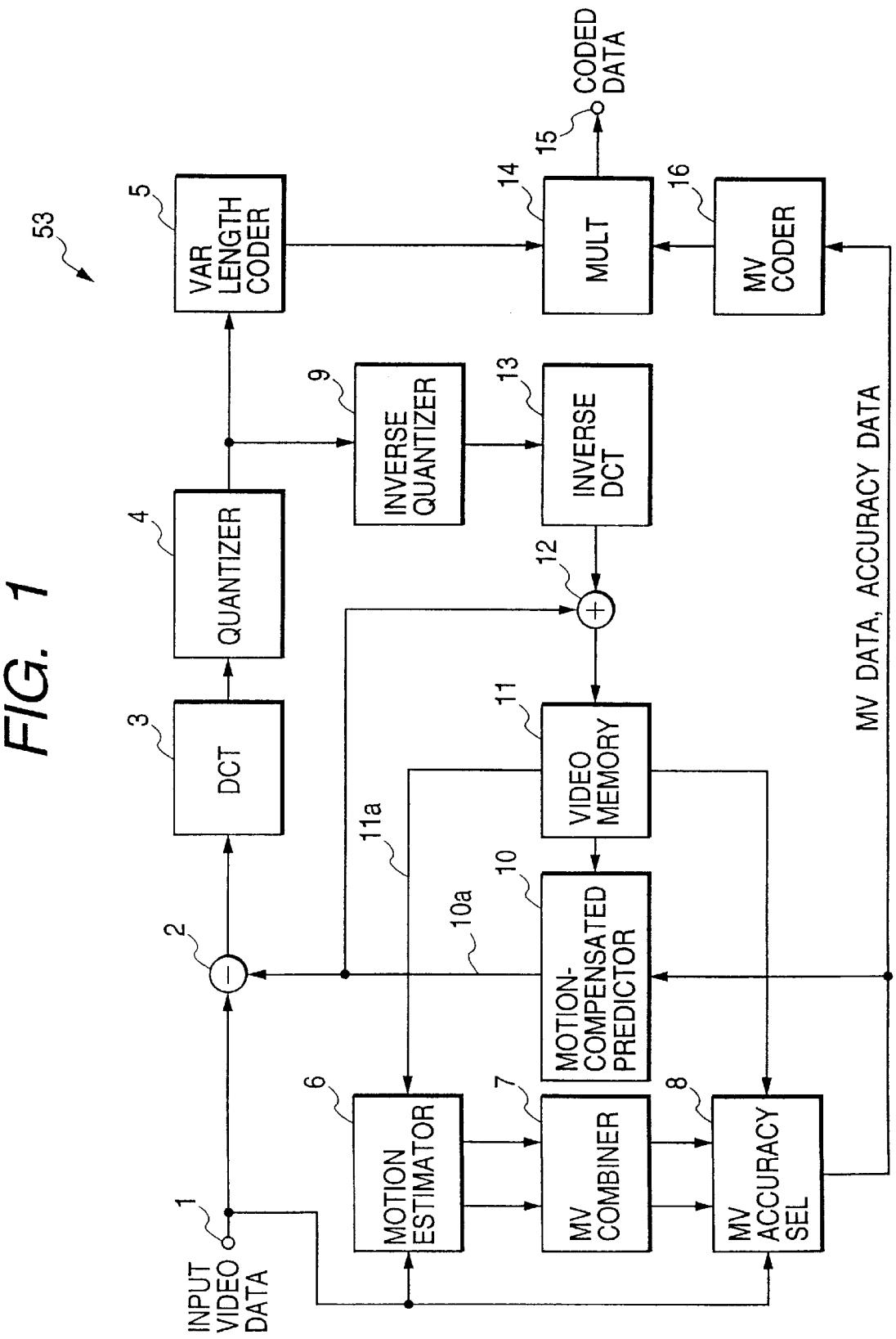
FIG. 1 is a block diagram of a motion-compensated coder of this embodiment of this invention.

FIG. 1 is a block diagram of a motion-compensated coder of this embodiment of this invention.

Input video data is supplied to a subtractor 2 and to a motion estimator 6 through an input terminal 1. The subtractor 2 subtracts a motion-compensated-predicted signal 10a from the input video data and supplies the difference as a prediction error to a DCT (Discrete Cosine Transform) 3.

The DCT 3 effects the discrete cosine transforming process at 8×8 pixels and supplies the obtained coefficients to a quantizer 4. The quantizer 4 quantizes the coefficients with predetermined step amount and outputs a fixed length coded coefficients to the variable length coder 5 and to an inverse quantizer 9.

Generally, the quantizing step amount is controlled in accordance with an amount of code to keep the data rate constant.

The variable length coder 5 converts coefficients of two dimensional 8×8 pixels into one dimensional array through zigzag scanning and codes the coefficients with Huffman codes.

On the other hand, inverse processes of the DCT 3 and the quantizer 4 are executed by the inverse quantizer 9, an inverse DCT 13 to reproduce the inter-frame prediction error. The inter-frame prediction error is added to the motion-compensated-predicted signal 10a from a motion-compensated predictor 10 by an adder 12 to provide a reproduced video data which is stored in a video memory 11.

Reproduced video data from the video memory 11, that is, a local decoded video data 11a is supplied to the motion estimator 6, to the motion-compensated predictor 10, and to a motion vector accuracy selector 8. The processing from the inverse quantizer 9 to the video memory 11 is called as local decoding which is essentially the same processing of a decoder mentioned later.

The motion-compensated predictor 10 shifts video data stored in the video memory 11 every bock in accordance with selected motion vectors from a motion vector accuracy selector 8 to obtain a motion-compensated predicted signal 10a which is supplied to the subtractor 2 and to the adder 12.

The motion estimator 6 effects block matching between the reproduced video data stored in the video memory 11 and the input video data with the reproduced video data shifted (shifting a reading address) every motion compensation block and determines the motion vector MV showing best matching (lowest error) every accuracy of motion compensation. The obtained N sets of motion vectors at N accuracies are supplied to a motion vector combiner 7 which combines motion vectors every motion vector group (motion vector block) every accuracy, N being a natural number more than one. The motion accuracy selector 8 obtains total amounts of code of kinds of motion vectors and motion-compensated-predictive-coded video data at the N different accuracies, selects one of the N different accuracies showing the lowest one of the N total amounts, generates accuracy data indicative of the selected one of the N different accuracies, and outputs the motion vectors corresponding to the selected one of the N different accuracies and the accuracy data to the motion-compensated predictor 10 and to the motion vector coder 16.

The coder 16 codes the motion vector data and the accuracy data.

The motion vector coder 16 obtains a difference between horizontal components of the motion vectors at the one block previous block (generally left) and the present block and a difference between vertical components of the motion vectors at the one block previous block (generally left) and the present block and codes the difference values with Huffman codes to supply the obtained code train of the motion vector to the multiplexer 14.

The prediction error signal is multiplexed with coded motion vectors and the accuracy data by the multiplexer 14. That is, the multiplexer 14 multiplies the code train of the motion vector and the accuracy data with the code train (bit stream) of the inter-frame prediction error, i.e., the output of the variable length coder 5 to output coded signal.

The motion estimator 6 obtains motion vectors at different accuracies every motion compensation block. More specifically, the motion vectors are obtained at one pixel accuracy and at half pixel accuracy. A quarter pixel accuracy may be provided.

The motion vectors at respective accuracies have substantially near values but accuracies are different. Then, it is possible to obtain the low accuracy of motion vectors by rounding the motion vectors at the high accuracy. However, it not always that the prediction error is low when the special distance is small, so that rounding does not provide the most suitable low accuracy motion vectors.

Particularly, if the accuracies are of one pixel and a half pixel, that is, the accuracy value is twice, rounding may cause offset.

However, because there is not a large difference between the motion vectors at the low accuracy and the high accuracy, it is not desirable but possible that the high accuracy motion vector is obtained from the difference from the low accuracy motion vectors.

The motion vector combiner 7 combines the motion vector every accuracy at every motion vector group.

Figure 5:
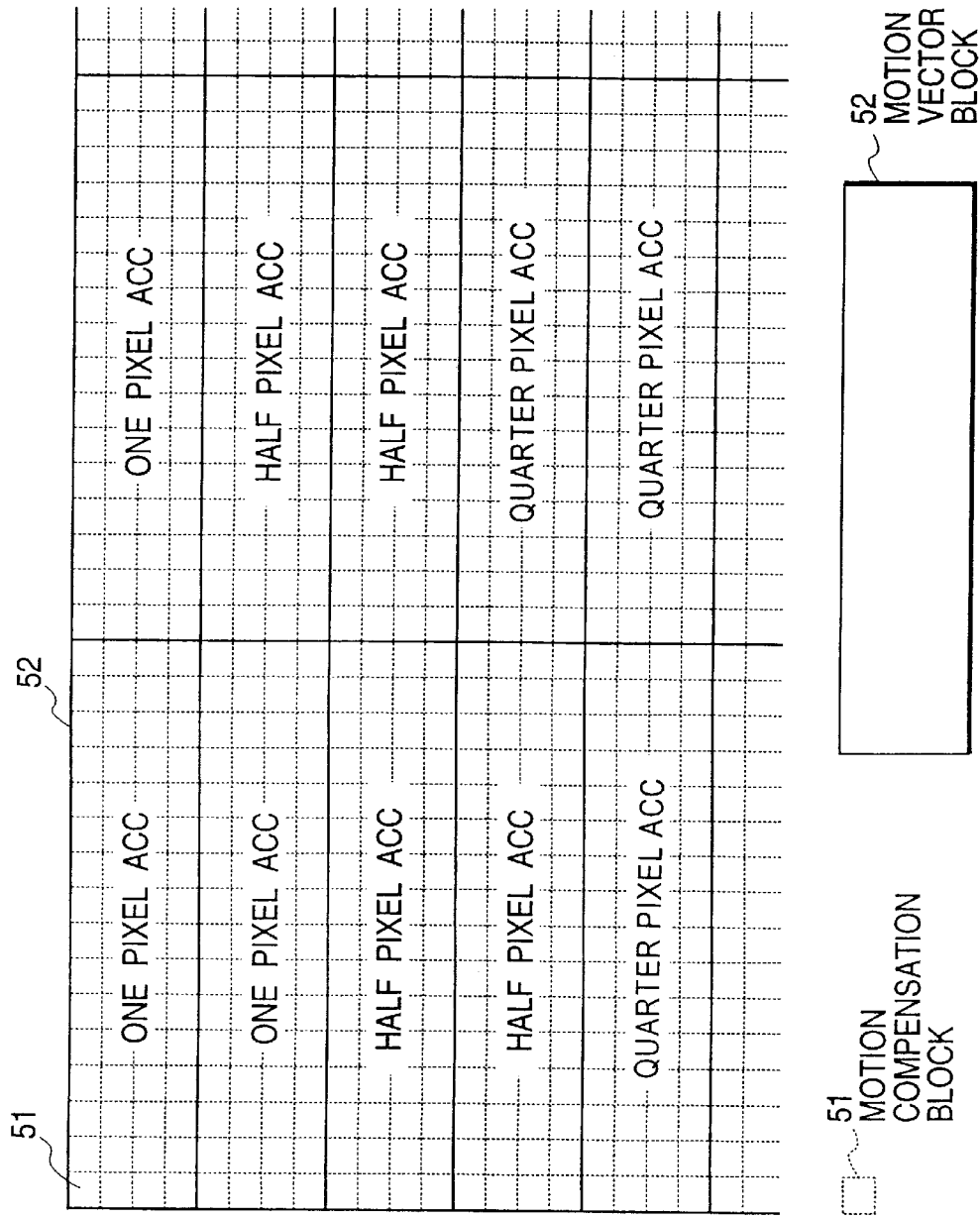
FIG. 5 is an illustration of this embodiment showing motion vector groups.
Figure 7:
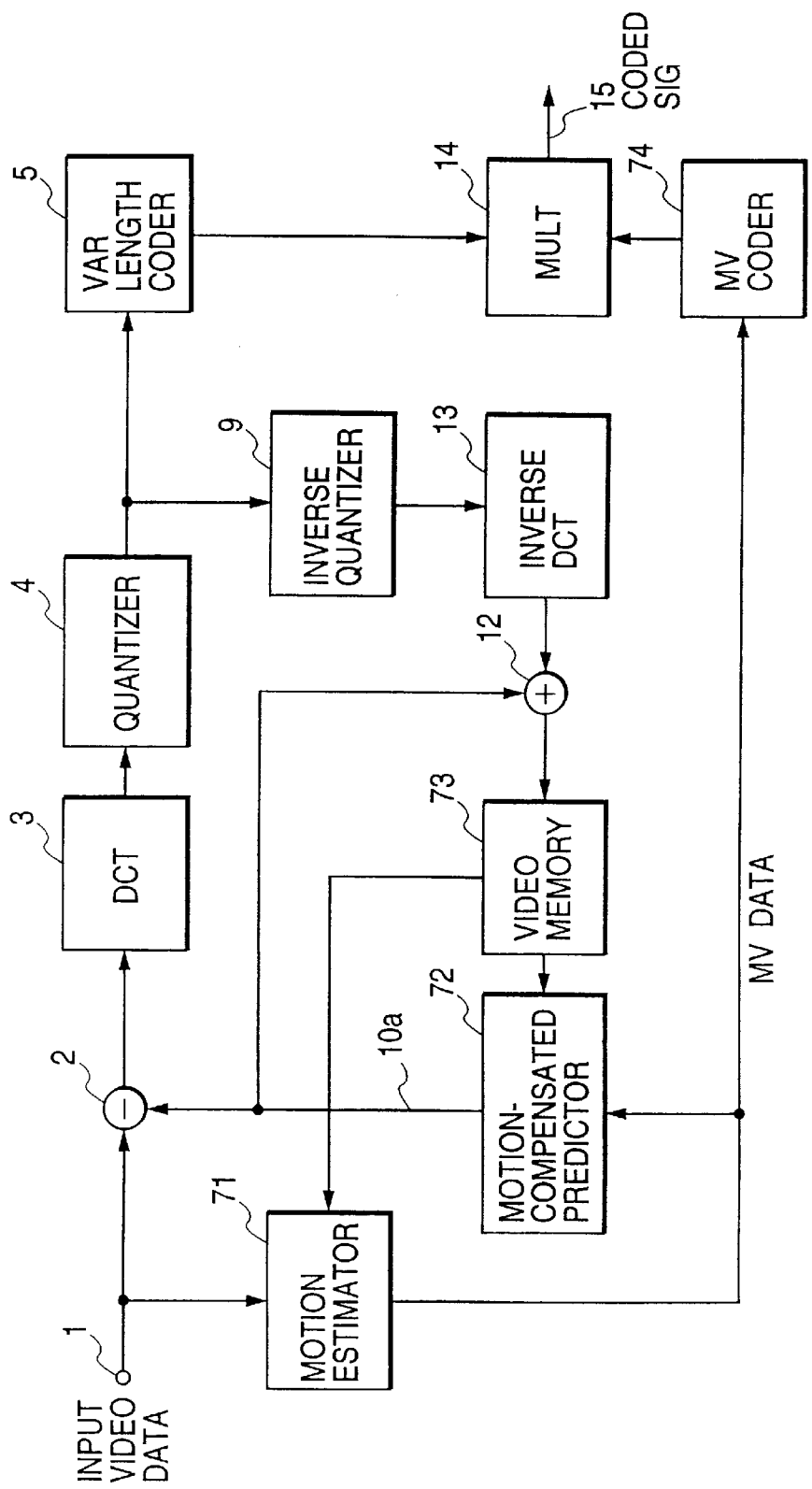
FIG. 7 is a block diagram of a prior art motion-compensated coder.
Figure 8:
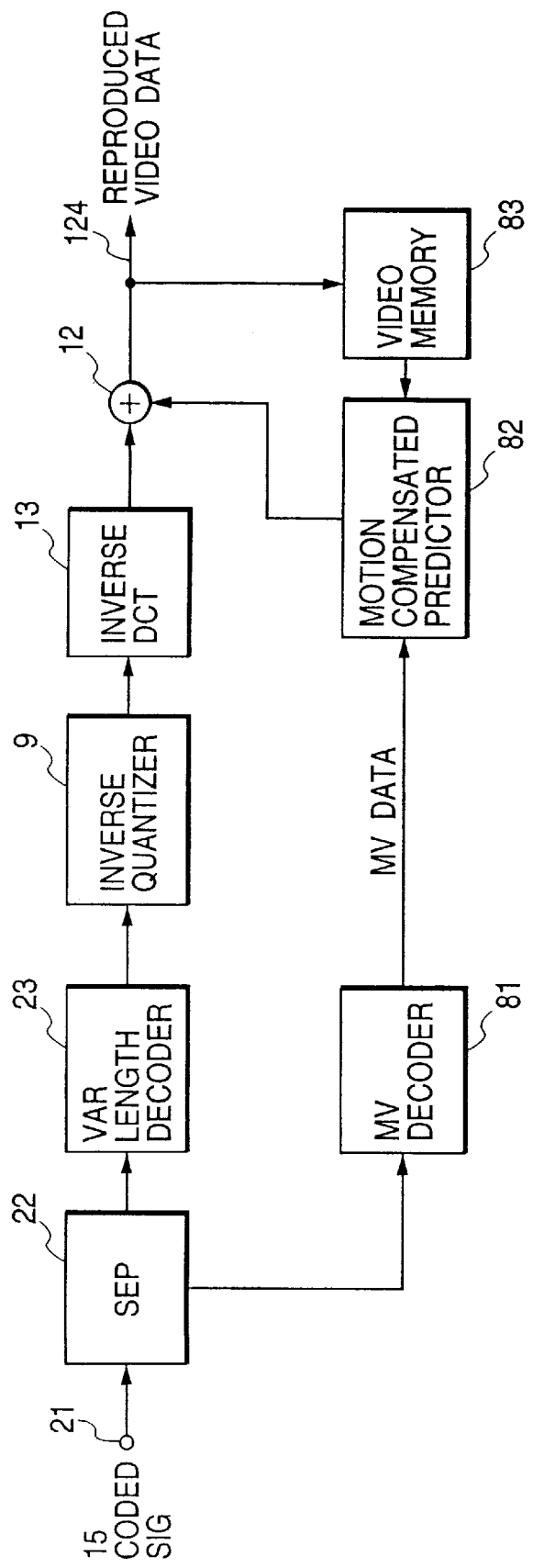
FIG. 8 is a block diagram of a prior art decoder for the motion-compensated prediction coder shown in FIG. 7.

FIG. 5 is an illustration of this embodiment showing motion vector groups.

The motion vector groups (motion vector block) are two dimensionally arranged such as Group of Block (GOB).

The size of the motion vector group may be 8×8 of the motion compensation blocks 51 but in this embodiment vertical 4 X horizontal 16 of motion compensation blocks 51 in consideration of signal processing of the input video data and error correction.

Figure 3:
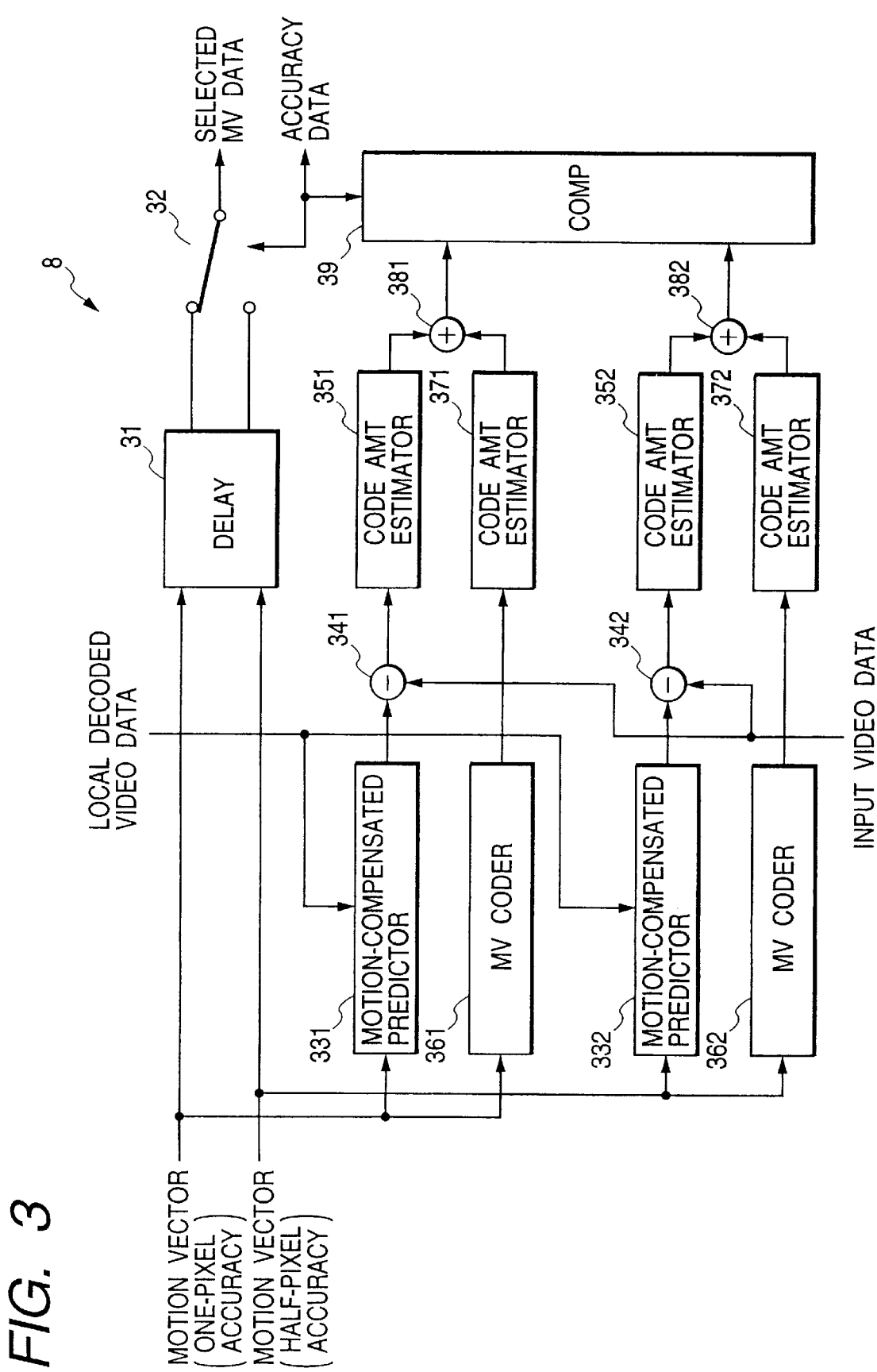
FIG. 3 is a block diagram of the motion accuracy selector shown in FIG. 1.

FIG. 3 is a block diagram of the motion accuracy selector 8 shown in FIG. 1.

The motion accuracy selector 8 selects one of a plurality of accuracies showing the lowest one of N total amounts of the motion vector and outputs the accuracy data and the motion vector of the selected accuracy. That is, N total amounts of codes of the motion vectors and the prediction error of inter-frame are estimated every motion vector group every accuracy and the accuracy showing the lowest one of N total amounts of codes is selected and the elected motion vector data corresponding to the selected accuracy and the accuracy data are outputted.

Motion vector at one-pixel accuracy is supplied to a delay 31, a motion-compensated predictor 331, and a motion vector coder 361. The delay 31 delays the motion vectors of the one-pixel accuracy and a half-pixel accuracy until end of the judging processing, that is, delays one motion vector group and supplies the delayed motion vector to the switch 32.

The motion-compensated predictors 331 and 332 have the conventional structure and generate prediction signals from the local decoded video data from the video memory 11 and supply them to subtractors 341 and 342. The subtractors subtract the prediction signals from the input video data to supply the prediction error to code amount estimators 351 and 352.

FIGS. 4A and 4B are block diagrams of the code amount estimators shown in FIG. 3.

The code amount estimator shown in FIG. 4A estimates the amount of code from the amount of prediction errors and the code amount estimator shown in FIG. 4B obtains the amount of codes through actual coding the prediction errors. The code amount estimator shown in FIG. 4A comprises a two-dimensional low pass filter 40 for suppressing high frequency components, an accumulator 41 for accumulating the low-pass-filtered prediction errors every motion vector group to obtain an accumulated amount of prediction errors every group. A code amount conversion table 42 converts the accumulated amount into an estimated amount every motion vector group. The code amount conversion table 42 is statistically obtained in advance and is fixed.

The code amount estimator shown in FIG. 4B comprises a DCT 43, a quantizer 44, a variable length coder 45, and a code amount calculator 46. The DCT 43, the quantizer 44, and the variable length coder 45 provide the coding process which is the same as that by the DCT 3, the quantizer 4, and the variable length coder 5 to provide the same code train. The code amount calculator 46 calculates the amount of the codes every motion vector group. The obtained amount of codes from the code amount estimator 351 and 352 are supplied to the adders 381 and 382 respectively.

Motion vector coders 361 and 362 obtain amounts of motion vector codes at one-pixel accuracy and half-pixel accuracy through actual coding processing. That is, the motion vector coders 361 and 362 code the motion vector by the same process as the motion vector coder 16 shown in FIG. 1. The obtained amounts of motion vector codes from the motion vector coders 361 and 362 are supplied to the code amount estimators 371 and 372, and supplied to the adders 381 and 382 respectively.

Adder 381 adds the estimated amount of motion-compensated predicted error from the code amount estimator 351 to the detected amount of motion vector codes from the code amount estimator 371 and supplies the total amount of codes to a comparator 39. Similarly, the adder 382 adds the estimated amount of motion-compensated predicted error from the code amount estimator 352 to the detected amount of motion vector codes from the code amount estimator 372 and supplies the total amount of codes to the comparator 39. The comparator 39 compares the total amounts and selects the accuracy showing the lowest total amount of codes and supplies the accuracy data to the switch 32 and to the motion vector coder 16.

If the motion vector is obtained at the accuracy of a quarter pixel, the total amount of codes is obtained and supplied to the comparator 39 which compares the total amounts of codes at accuracies of one-pixel, half-pixel, and quarter-pixel and selects the accuracy showing the lowest total amount of codes to control the switch 32 and supplies the accuracy data to the motion vector coder 16.

FIGS. 6A to 6C are graphical drawings of this embodiment showing variation of the amounts of code.

The inventor discovered the variation of the amount of codes, wherein the total amount of code varies in accordance with correlation and the degree of motion of images.

In FIG. 6A, in the case of low correlation and low degree of motion, the amount of code of prediction error 102a decreases with increase in the motion vector accuracy (the accuracy 0.25 pixel is higher than the accuracy 1.0 pixel). Similarly, in FIGS. 6B and 6C, the amounts of code of prediction error 102b and 102c decrease with increase in the motion vector accuracy. That is, the amount of code of prediction error always decreases with increase in the motion vector accuracy.

In FIG. 6A, the amount of code of motion vector 103a increases with increase in the motion vector accuracy. Similarly, in FIGS. 6B and 6C, the amounts of code of motion vectors 103b and 103c increase with increase in the motion vector accuracy. That is, it is always that the amount of code of motion vectors always increases with increase in the motion vector accuracy. Accordingly the total amount of code variation (101a to 101c) varies in accordance with the image picture and the motion. Then, the motion vector accuracy selector 8 adaptively selects the motion vector accuracy 8 in accordance with the total amount of code.

The motion vector obtained by the motion accuracy selector 8 is supplied to the motion-compensated predictor and to the motion vector coder 16. In addition, the motion vector accuracy selector 8 supplies the accuracy data indicative of the selected accuracy of the motion vector to the motion vector coder 16.

The motion vector coder 16 converts the codes of the motion vectors into a variable length codes. The variable length coding may be the well known variable length coding. However, it is desirable that the variable length coding is performed every motion vector group to effectively code the motion vectors.

In the motion vector coder 16, because the accuracy data is multiplexed every motion vector group, the values of the motion vectors are normalized as the motion vector code at one pixel accuracy and the common conversion code table is used.

In FIG. 1, delaying is not specially shown. However, it is necessary to delay the processing of the prediction coding by the interval necessary for processing in the motion vector combiner 7 and the motion accuracy selector 8.

Figure 2:
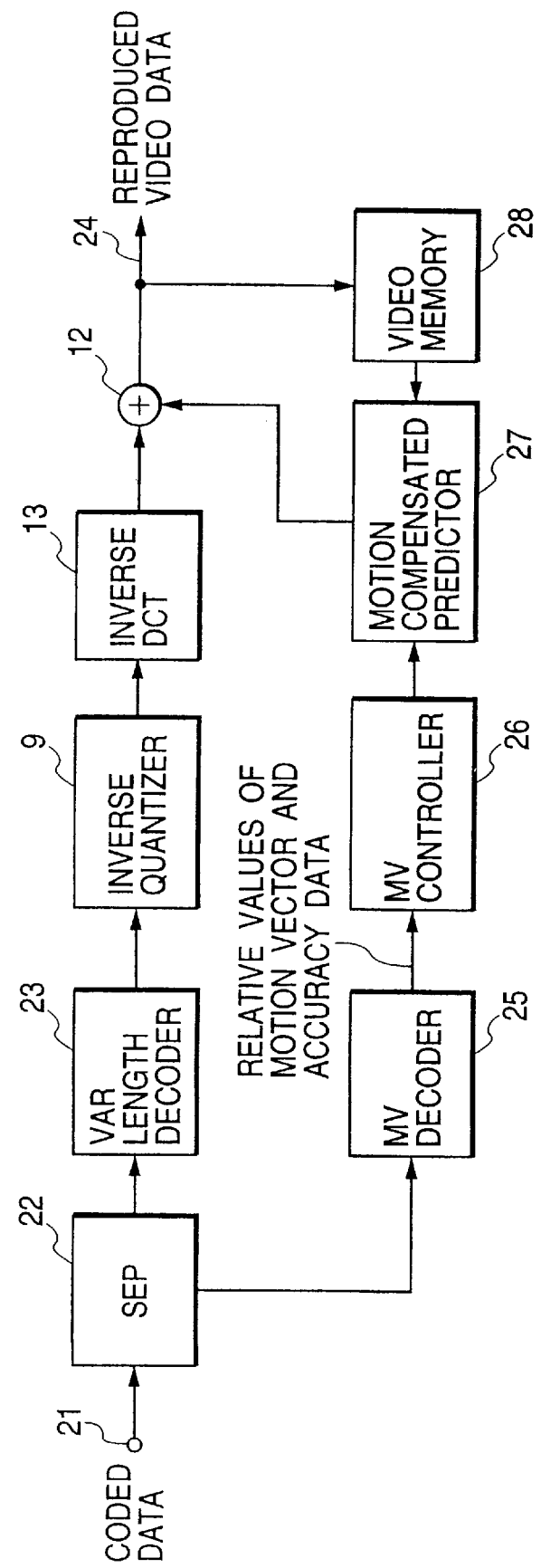
FIG. 2 is a block diagram of a decoder for the motion-compensated prediction coder shown in FIG. 1.

FIG. 2 is a block diagram of a decoder for the motion-compensated prediction coder shown in FIG. 1.

The coded data is inputted from an input 21 and supplied to a separator 22 which separates the coded data into the code train of the inter-frame prediction errors supplied to a variable length decoder 23 and the code train of the motion vectors and accuracy data supplied to a motion vector decoder 25. The inter-frame prediction error is converted into the fixed length code by the variable length decoder 23 and coefficients of 8×8 pixels are supplied to an inverse quantizer 9. The inverse quantizer 9 and an inverse DCT 13 outputs reproduced prediction errors. On the other hand, the code train of the motion vectors is supplied to the motion vector decoder 25 which decodes the code train of the motion vectors and the accuracy data and supplies the obtained motion vector data, i.e., relative values of motion vector and the accuracy data to a motion vector controller 26. The motion vector controller 26 multiples the relative values of motion vector by the accuracy data to reproduce the motion vectors and supplies the reproduced motion vectors to a motion-compensated predictor 27. The motion-compensated predictor 27 effects motion compensation to the video data from a video memory 28 in accordance with the motion vector from the motion vector controller 26 and generates and supplies an inter-frame motion-compensated prediction signal to an adder 12. The adder 12 adds the inter-frame motion-compensated signal to the reproduced prediction errors to output reproduced video data 24 which is stored in the video memory 28. The adder 12, the inverse quantizer 9, and the inverse DCT 13 in FIG. 2 have the same structure as those shown in FIG. 1 respectively.

As mentioned above, in this invention the total amount of codes is reduced by obtaining a plurality of motion vectors at different accuracies, combining a plurality of kinds of motion vectors into motion vector groups of the motion vectors every accuracy, obtaining amounts of codes every accuracy, and selecting one of the different accuracies showing a lowest mount of the code. The motion compensation in coding is effected at different accuracies to reduce the total amount of the code. Inversely, it is assumed that the amount of codes (data rate) is constant, controlling the amount of code makes the quantization fine, so that a quality of the reproduced image is improved.

As mentioned, the motion-compensated predictive coding apparatus according to this invention includes, a motion estimator 6 responsive to input video data and local decoded video data 11a for obtaining N motion vectors at N different accuracies every first block (motion compensation block) 51 of pixels of the video data respectively, the vector combiner 7 responsive to the motion vector estimator 6 for combining the N motion vectors at every second block (motion vector block) 52 including M (4×16) of the first blocks every N different accuracies, M and N being natural numbers, N being more than one, the motion vector accuracy selector 8 responsive to the motion vector combiner 7, the video data, and the local decoded video data 11a for obtaining N amounts of code of the N kinds of motion vectors, selecting one of the N different accuracies showing the lowest total mount of the code, generating accuracy data indicative of one of the N different accuracies, and outputting the motion vectors corresponding to the selected one of the N different accuracies, and a motion-compensated predictive coding circuit responsive to the video data and vector accuracy selector 8 for motion-compensated-predictive-coding the video data using the outputted motion vectors at the selected one of the N different accuracies, generating the local decoded video data, and outputting the motion-compensated-predictive-coded video data, the outputted motion vectors, and the accuracy data.

What is claimed is:

1. A motion-compensated predictive coding apparatus comprising:

motion vector estimation means responsive to video data and local decoded video data for obtaining N kinds of motion vectors at N different accuracies every first block of pixels of said video data respectively;

vector combining means responsive to said motion vector estimation means for combining said N kinds of motion vectors at every second block including two-dimensionally arranged M of said first blocks every said N different accuracies, M and N being natural numbers, N being more than one;

motion vector accuracy selection means responsive to said vector combining means, said video data, and said local decoded video data for obtaining N total amounts of code of said N kinds of motion vectors and motion-compensated-predictive-coded video data at said N different accuracies, selecting one of said N different accuracies showing the lowest one of said N total amounts, generating accuracy data indicative of the selected one of said N different accuracies, and outputting said motion vectors corresponding to the selected one of said N different accuracies and said accuracy data;

motion-compensated predictive coding means responsive to said video data and vector accuracy selection means for motion-compensated-predictive-coding said video data using the outputted motion vectors at the selected one of said N different accuracies, generating said local decoded video data; and outputting means for outputting the motion-compensated-predictive-coded video data, the outputted motion vectors, and the outputted accuracy data.

2. A decoder supplied with coded data including motion-compensated-predicted video data and data including codes of motion vectors and accuracy data, said motion vectors being obtained every first block at one of N accuracies selected every second block including M of said first blocks at one of said N accuracies indicted by said accuracy data, M and N being natural numbers, N being more than one, comprising:

separating means for separating said coded data into said motion-compensated-predicted video data and said data;

multiplying means responsive to said separating means for multiplying said codes of motion vectors by said accuracy data every said second block;

motion-compensated inter-frame prediction means for generating a motion-compensated inter-frame predicted signal from said codes of motion vectors multiplied with said accuracy data by said multiplying means, so that said accuracy is selected every said second block; and inter-frame prediction decoding means for decoding said motion-compensated-predicted video data from said separating means with said motion-compensated inter-frame prediction signal and outputting decoded video data.

3. A method of motion-compensated-predictive-coding video data, comprising the steps of:

(a) obtaining N kinds of motion vectors at N different accuracies every first block of pixels of said video data respectively;

(b) combining said N kinds of motion vectors at every second block including two-dimensionally arranged M of said first blocks every said N different accuracies, M and N being natural numbers, N being more than one;

(c) obtaining N total amounts of code of said N kinds of motion vectors and motion-compensated-predictive-coded video data obtained using said N kinds of said motion vectors at every said accuracy;

(d) selecting one of said N different accuracies showing the lowest one of said N total amounts;

(e) generating accuracy data indicative of the selected one of said N different accuracies;

(f) outputting said motion vectors corresponding to the selected one of said N different accuracies and said accuracy data;

(g) motion-compensated-predictive-coding said video data using the outputted motion vectors at the selected one of said N different accuracies, generating said local decoded video data, and (h) outputting the motion-compensated-predictive-coded video data, the outputted motion vectors, and the outputted accuracy data.

4. A method of decoding coded video data including motion-compensated-predicted video data and data including codes of motion vectors and accuracy data, said motion vectors being obtained every first block at one of N accuracies selected every second block including M of said first block at one of said N accuracies indicted by said accuracy data, M and N being natural numbers, N being more than one, comprising the steps of:

separating said coded video data into said motion-compensated-predicted video data and said data including codes of motion vectors and accuracy data;

multiplying said codes of motion vectors by said accuracy data every said second block;

generating a motion-compensated inter-frame predicted signal from said codes of motion vectors multiplied with said accuracy data, said accuracy being selected every said second block; and decoding the separated motion-compensated-predicted video data with said motion-compensated inter-frame predicted signal; and outputting said decoded video data.

5. In a high efficiency coding apparatus for a moving picture image effecting motion compensation inter-frame prediction to an input motion picture image signal, motion compensation coding apparatus characterized by comprising:

motion prediction means for obtaining for every block a plurality of kinds of motion vectors having different respective accuracies;

motion vector combining means for combining motion vectors of said respective blocks for each of the accuracies and obtaining vector groups at every said accuracy;

motion vector accuracy selection means for selecting one of the accuracies of the motion vectors which is predicted to have the lowest amount of code during coding with motion vectors of respective accuracies every motion vector group; and means for effecting motion compensated inter-frame predicted coding using the selected motion vectors.

6. In a high efficiency decoding apparatus for a moving picture image effecting motion compensation, separation means for separating coded data including motion-compensated-predicted video data and data including codes of motion vectors and accuracy data into motion-compensated-predicted video data and accuracy information every motion vector group unit;

multiplying means responsive to said separation means for multiplying said codes of motion vectors by said accuracy data;

motion compensation prediction means for obtaining a motion compensation inter-frame predicted signal with the accuracy of the motion vector changed in accordance with the accuracy information of said motion vector every motion vector group unit; and means for obtaining a reproduction image through inter-frame prediction decoding with said motion compensation inter-frame predicted signal.

7. In a method of high efficiency coding for a moving picture image effecting motion compensation inter-frame prediction to an input motion picture image signal, a method of motion compensation coding characterized by the steps of:

obtaining a plurality of kinds of motion vectors having different accuracies every block;

combining motion vectors of respective said blocks every accuracies and obtaining vector groups every said accuracy;

selecting one of the accuracies of the motion vectors which is predicted to have the lowest amount of code during coding with motion vectors of respective accuracies every motion vector group; and effecting motion compensated inter-frame predicted coding using the selected motion vectors.

8. In a method of high efficiency decoding for a moving picture image effecting motion compensation characterized by the steps of:

separating coded data including motion-compensated-predicted video data and data including codes of motion vectors and accuracy data into motion-compensated-predicted video data and accuracy information every motion vector group unit;

multiplying said codes of motion vectors by said accuracy data;

obtaining a motion compensation inter-frame predicted signal with the accuracy of the motion vector changed in accordance with the accuracy information of said motion vector every motion vector group unit; and obtaining a reproduction image through inter-frame prediction decoding with said motion compensation inter-frame predicted signal.

9. A motion-compensated predictive coding apparatus comprising:

motion vector estimation means responsive to video data and local decoded video data for obtaining N kinds of motion vectors at N different accuracies every first block of pixels of said video data respectively;

vector combining means responsive to said motion vector estimation means for combining said N kinds of motion vectors at every second block including M of said first blocks every said N different accuracies, M and N being natural numbers, N being more than one;

motion vector accuracy selection means responsive to said vector combining means, said video data, and said local decoded video data for obtaining N total amounts of code of said N kinds of motion vectors and motion-compensated-predictive-coded video data at said N different accuracies, selecting one of said N different accuracies showing the lowest one of said N total amounts, generating accuracy data indicative of the selected one of said N different accuracies, and outputting said motion vectors corresponding to the selected one of said N different accuracies and said accuracy data;

motion-compensated predictive coding means responsive to said video data and vector accuracy selection means for motion-compensated-predictive-coding said video data using the outputted motion vectors at the selected one of said N different accuracies, generating said local decoded video data, and multiplexing means for multiplexing the outputted accuracy data with the motion-compensated-predictive-coded video data every said second block and the outputted motion vectors.

10. A decoder as claimed in claim 2, wherein each said second block includes a two-dimensional arrangement of said M first blocks and said multiplying means multiplies said codes of motion vectors by said accuracy data every said second block including two-dimensionally arranged M of said first blocks.

11. A method of decoding as claimed in claim 4, wherein each said second block includes a two-dimensional arrangement of said M first blocks and said codes of motion vectors are multiplied in said step of multiplying by said accuracy data every said second block including two-dimensionally arranged M of said first blocks.

12. A method of high efficiency coding as claimed in claim 7, wherein:

said step of obtaining a plurality of kinds of motion vectors comprises obtaining for every block a plurality of motion vectors having different respective accuracies;

said step of combining motion vectors comprises combining said plurality of motion vectors of each of said different accuracies for each of said blocks, thereby obtaining said vector groups for each of said different accuracies;

said step of selecting one of the accuracies comprises selecting for each block a respectively corresponding accuracy for which the respective motion vector has a lowest amount of code during coding, and thereby selecting for each block a respectively corresponding lowest coding motion vector from each corresponding motion vector group at said respectively corresponding accuracy, and said step of effecting motion compensated inter-frame predicted coding is implemented for each block using the motion vector respectively corresponding thereto at the selected accuracy respectively corresponding thereto.

13. A method of motion-compensated predictive coding comprising the steps of:

obtaining N kinds of motion vectors at N different accuracies for every first block of pixels of said video data, respectively;

combining said N kinds of motion vectors at every second block including M of said first blocks every said N different accuracies, M and N being natural numbers, N being more than one;

obtaining N total amounts of code of said N kinds of motion vectors and motion-compensated-predictive-coded video data at said N different accuracies;

selecting one of said N different accuracies showing the lowest one of said N total amounts;

generating accuracy data indicative of the selected one of said N different accuracies, outputting said motion vectors corresponding to the selected one of said N different accuracies and said accuracy data;

effecting motion-compensated-predictive-coding of said video data using the outputted motion vectors at the selected one of said N different accuracies;

generating said local decoded video data, and multiplexing the outputted accuracy data with the motion-compensated-predictive-coded video data every second block and the outputted motion vectors.

* * * * *